United States Patent
Tackes et al.

(10) Patent No.: US 7,414,502 B2
(45) Date of Patent: Aug. 19, 2008

(54) HARSH ENVIRONMENT COIL-ACTUATOR FOR A CARTRIDGE TYPE VALVE

(75) Inventors: John N. Tackes, Rockford, IL (US); Dilip M. Amladi, Rockford, IL (US)

(73) Assignee: Delta Power Company, Rockford, IL (US)

( * ) Notice: Subject to any disclaimer, the term of this patent is extended or adjusted under 35 U.S.C. 154(b) by 267 days.

(21) Appl. No.: 11/351,590

(22) Filed: Feb. 10, 2006

(65) Prior Publication Data

US 2006/0180783 A1    Aug. 17, 2006

Related U.S. Application Data

(60) Provisional application No. 60/652,721, filed on Feb. 14, 2005.

(51) Int. Cl.
*F16K 31/02*   (2006.01)
*H01F 7/08*    (2006.01)

(52) U.S. Cl. .................................. 335/220; 251/129.15

(58) Field of Classification Search ................. 335/151, 335/162, 278, 255, 281, 260; 251/129.15, 251/129.01
See application file for complete search history.

(56) References Cited

U.S. PATENT DOCUMENTS

| | | | | |
|---|---|---|---|---|
| 3,805,099 A | * | 4/1974 | Kelly | ............................ 310/12 |
| 3,815,633 A | * | 6/1974 | Greenwood et al. | ..... 137/625.27 |
| 5,029,513 A | * | 7/1991 | Duffy | ............................. 91/31 |
| 5,138,292 A | * | 8/1992 | Forster | ......................... 335/278 |
| 2003/0052051 A1 | * | 3/2003 | Nam et al. | ................... 210/418 |
| 2006/0027773 A1 | * | 2/2006 | Nordstrom et al. | ...... 251/129.15 |

* cited by examiner

*Primary Examiner*—Elvin Enad
*Assistant Examiner*—Alexander Talpalatskiy
(74) *Attorney, Agent, or Firm*—Foley & Lardner LLP

(57) ABSTRACT

Illustrated is a cartridge type solenoid valve with a coil-actuator structure which employs O-ring seals to inhibit harsh environment entry into the coil-actuator and allows for metal to metal contact with the frame to increase the flux density and path for flux when the valve is in operation. A plastic over mould is encapsulated over the metal frame (in one embodiment a sleeve) which is shaped to provide efficient magnetic flux carrying capability, as well as abut a flux connector, e.g. a disc adapted to capture an O-ring. The O-ring is in sealing contact with a capture element, e.g. a nut on the projecting extended end of an insertable cartridge having an internal plug, environmentally sealing the coil. When the capture nut is assembled on to the plug, in sealing engagement with the O-ring and simultaneously engaging the plug, an increased efficiency flux path is created. The lead wire termination version includes cold forming or latched caps over lead wires to provide environmental (or dunk) sealing.

29 Claims, 8 Drawing Sheets

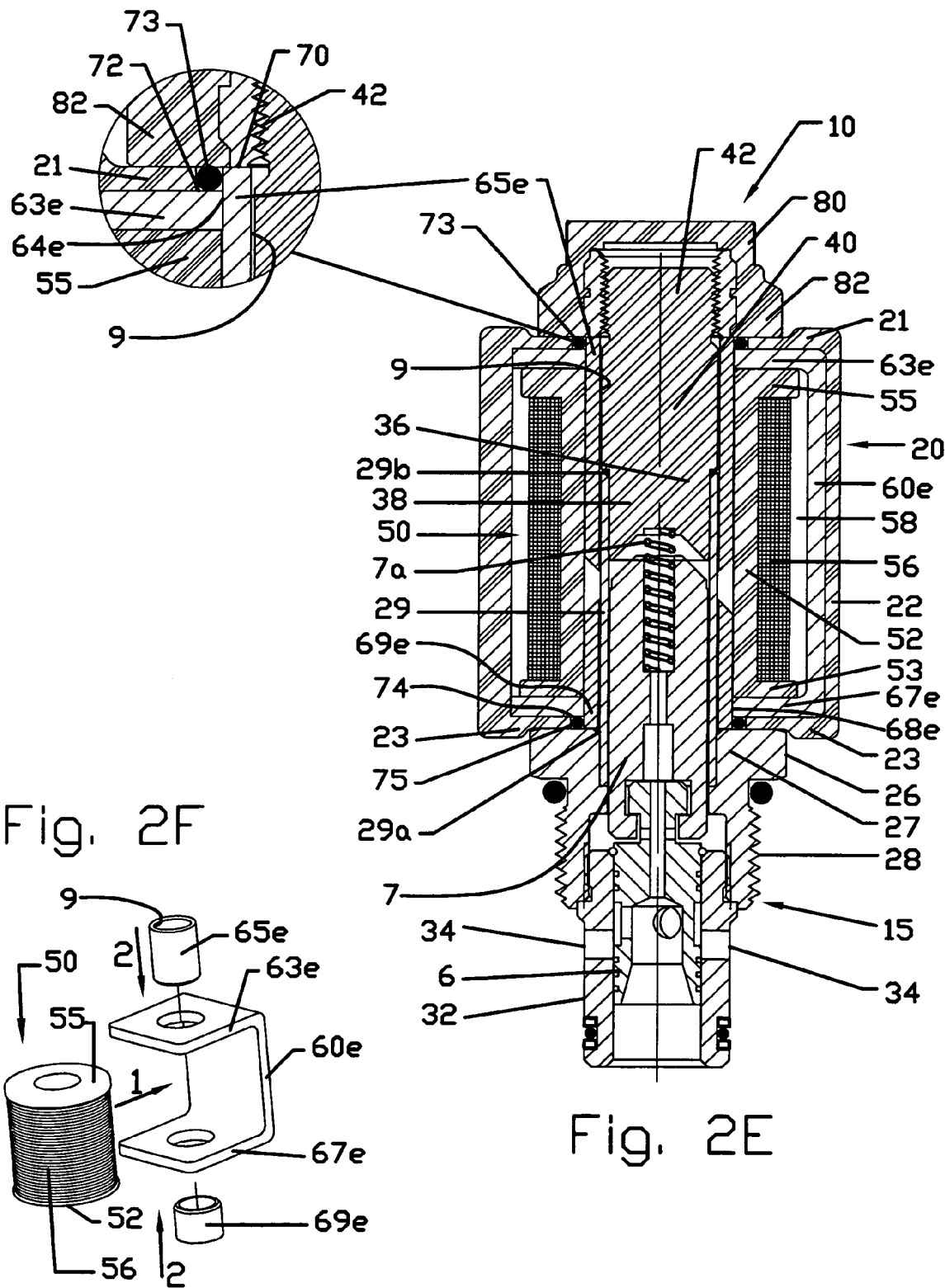

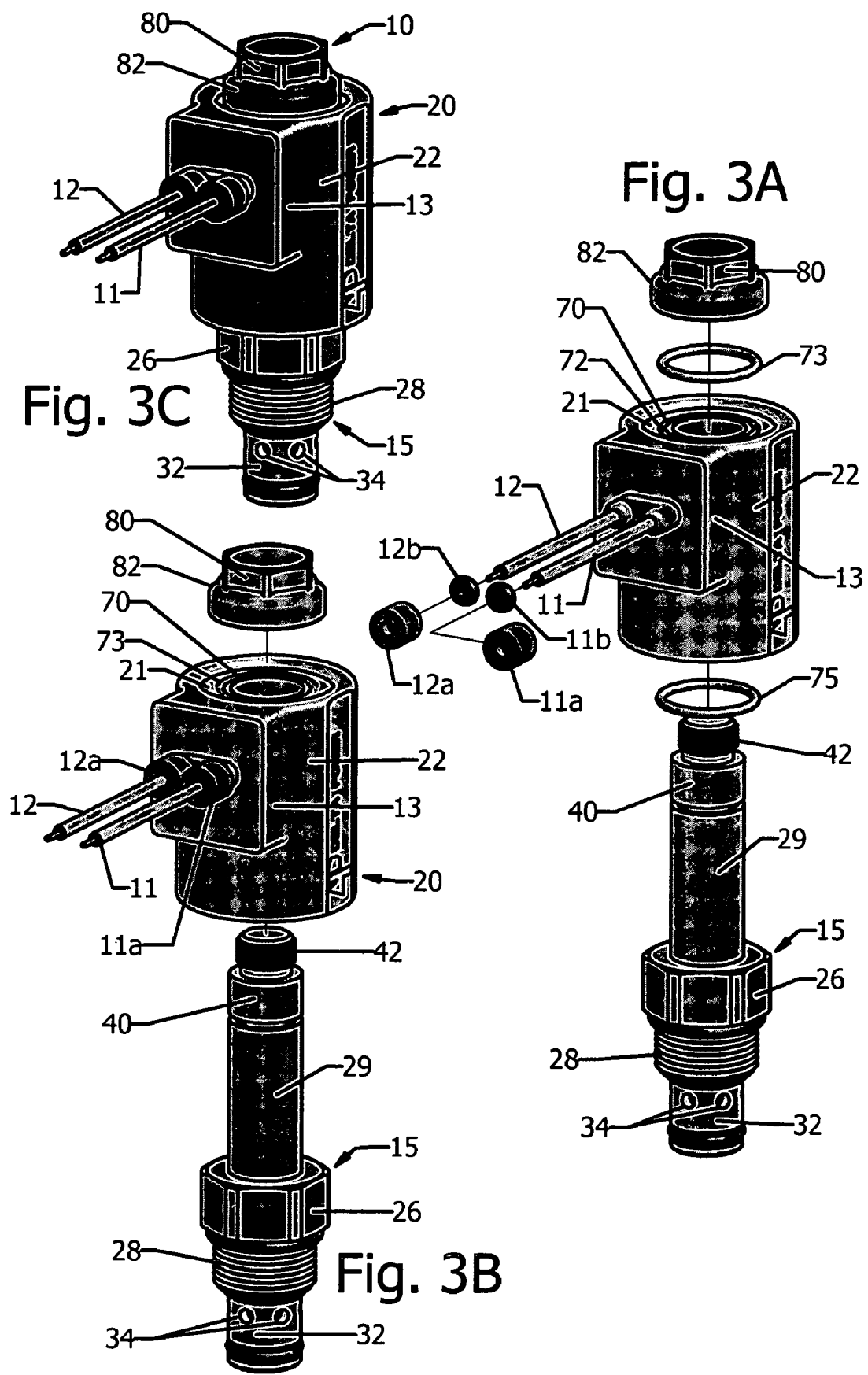

HARSH ENVIRONMENT COIL-ACTUATOR FOR A CARTRIDGE TYPE VALVE

CROSS-REFERENCE TO RELATED PATENT APPLICATIONS

Applicants hereby claim the benefit under Title 35, United States Code § 119(e) of U.S. provisional application 60/652,721, filed on Feb. 14, 2005.

BACKGROUND OF THE INVENTION

1. Field of the Invention

The present invention relates to solenoid valves and more particularly relates to an improved construction for coil-actuators for cartridge type solenoid valves which may be subject to severe environmental conditions.

2. Background

For many years the mobile hydraulics industry has been looking for an economical but durable coil used on their valves even when the valves are exposed to harsh environments. For this reason expensive, external frame ("Shell-over"), non-recyclable "Epoxy based Thermoset" coils have been utilized and are still employed for most severe, environmentally unfriendly, applications. However for economic reasons, where the most severe environmental conditions do not exist, less expensive, recyclable "Internal Frame Thermoplastic or Glass Filled Nylon" (hereinafter referred to as Thermoplastic Type or "plastic") encapsulated coils have taken over most of the mobile market. A few coil/valve manufacturers have attempted to apply various secondary operations to provide products that would survive severe operating conditions, but these have met with little global acceptance. Still others have adopted external frame coils ("shell over") with thermoplastic encapsulated windings but also have struggled to make these globally accepted primarily due to environmental performance and/or cost/manufacturing variance issues.

A few major OEM Mobile Equipment manufacturers, and some independent bodies (IEC, DIN . . . i.e. IP ratings) have produced various environmental integrity test specifications over a span of many years in order to "get comfort" in applying these products in the various severe environments. The most severe test for coils for valves of this type is Delta Power Company's "Powered Severe Thermal Shock Immersion Test". Development progress towards satisfactory coil configurations in Internal Frame Thermoplastic type coil configurations, when confronted with a harsh environment, has generally been unsatisfactory due to the inability to satisfactorily seal the coil. The unsatisfactory results are in comparing the Internal Frame Thermoplastic encapsulated coil type in performance to the "Epoxy based Thermoset" encapsulated coils (expensive/not recyclable "shell-over" Type).

These efforts include or have included 1) Post encapsulation impregnations (Acrylic & "Sealant Glues") intended to seal or fill the pores of base encapsulate, 2) Various bobbin flange edge designs so as to melt and bond to over mould encapsulates, 3) "bobbin-less" manufacturing techniques so as to eliminate the "seams in the encapsulate" altogether, 4) Techniques of over moulding previously moulded assemblies at extreme pressures with the intent to "create a impregnable shell", 5) use of special coil encapsulate "rubbers", 6) Local "potting" as a post encapsulate barrier and 7) finally the use of elastomer seals in critical locations. All of these techniques, up until recently, have produced a balance between a performance level somewhat between the "Epoxy Thermoset" "shell-over" design configuration and typical "Thermoplastic" configurations and all equivalent performance solutions provided for substantially higher cost of manufacture when compared to a typical "Internal Frame Thermoplastic" coil configuration.

Another problem area with coil actuators is maximizing coil efficiency by reducing magnetic losses in the moving air gap region (the space between the moving armature, and adjacent flux projecting surfaces). The critical idea is to increase the magnetic attraction/repulsion force for a given current input to the coil without exceeding the coils heat dissipation limit while reducing the space required for the coil-actuator.

Other encountered problem areas in coil constructions of the Thermoplastic encapsulated coil types is the sealing of the exit of the coil lead wires from the body of the coil-actuator.

SUMMARY OF THE INVENTION

In view of the above, it is a principal object of the present invention to provide a novel coil-actuator configuration of the internal frame thermoplastic encapsulated coil type with integrally moulded or sealed lead wire connectors.

Another object of the present invention is to provide a harsh environment coil-actuator structure or assembly with an increased efficiency "magnetic flux" (afterwards referred to as "flux") carrying capability actuator to increase the force generated by coil energization between the coil and the armature connected to the valve spool.

Still another object of the present invention is to provide a coil actuator for a valve which is thermal shock resistant, is dunk capable, as well as weather resistant for activating armature solenoid valves in very demanding off-highway applications (e.g. hydraulic valves for farm or construction work vehicles).

Yet another object of the present invention is to reduce or eliminate external or exposed metal parts of the coil actuator which are conventionally plated Hexavalent Chromium (Hexachrome) conversions used typically on Zinc Plating on many commercial fasteners and on most products in the hydraulic cartridge valve industry. It is notable that this plating degrades rapidly under adverse conditions and is difficult to dispose of environmentally.

One of the unique features of the present invention is the use of O-rings which are external to the frame of the coil, which provides the environmental 'dunk' sealing between the junction interfaces between the metal frame and plastic over mould and bobbin. The plastic over mould forms a cover for the coil actuator and is encapsulated over the metal frame. The metal frame may be composed of any magnetically capable flux carrying material which is shaped to provide efficient magnetic flux carrying capability. For example, the frame may be composed of a powdered metal and/or formed by a rolled and/or stamped manufacturing technique. In metal to metal contact with the frame are axially spaced apart flux path connectors which may also be made of a powdered metal and/or formed by either a stamped or rolled tube operation. The connectors are in abutting, intimate contact with the frame (and even may be formed as part thereof), which connectors may take the form of a washer like disc, which disc is adapted to engage the O-rings.

In one of the embodiments shown, the disc is also engaged in its interior apertured periphery by a sleeve which axially projects beyond the plane of the Disc, The sleeve forms, in conjunction with the disc, a lip or interior wall for inhibiting radially inward displacement of the O-ring. Preferably, a second radially spaced apart second wall or lip is formed by a terminal portion of the plastic over mould or cover, forming an annular receptacle for receiving the O-ring. The O-ring is in sealing contact with a capture element (e.g. a nut) displaceably mounted on the projecting extended end of a (internal) plug which is part of an insertable cartridge in which the valve spool may reciprocate in response to coil energization. The capture element or nut also preferably engages at least the terminal portion of the plastic over mould and the O-ring and thus environmentally seals the coil. When the capture nut is assembled on to the plug, in sealing engagement with the O-ring, it simultaneously engages the axially extending lip or axially extending sleeve. Inasmuch as the sleeve engages the flux connectors or discs, which is in engagement with or forms part of the internal frame, an increased efficiency flux path is created.

To facilitate closure of the coil actuator and assembly of the same, while simultaneously increasing the flux path and efficiency of the coil when in operation, a retainer, in the illustrated instance a nut similar to the capture element or nut is preferably connected adjacent to the remote or distal end of the cartridge so that as the capture element is engaged with the opposite end of the plug, the nut effects sealing of the remote end of the coil actuator. Simultaneously, therefore, metal to metal engagement with the sleeve occurs through the second flux path connector or washer like disc which lies intermediate the nut and the sleeve portion of the frame.

As shown in the drawings and as described hereinafter, the receptacle for capturing the O-ring may be formed in a number of ways. The system requirements being (1) that the capture nut is in a flux path with the disc and frame of the coil actuator assembly to optimize the flux path and increase efficiency of the coil actuator, and; (2) that the O-ring in conjunction with the encapsulation, and the capture nut inhibits contaminant entry into the assembly. To provide additional environmental sealing of the coil-actuator, the coil lead wire termination includes cold forming or latched caps over lead wires to thereby provide environmental (or dunk) sealing of the external wire leads.

Using coils with external O-rings and separate flux path connectors or metal end washer like discs, which are all retained in the coil-actuator assembly, and mated in assembly with a cartridge valve insert by a capture element or nut, constructs a one-piece, but separate part replaceable, coil-actuator assembly. This construction has the advantage of efficiently closing the magnetic path even though it is not a one-piece assembly.

Other objects and a more complete understanding of the present invention may be had by referring to the following specification taken in conjunction with the accompanying drawings in which:

BRIEF DESCRIPTION OF THE DRAWINGS

FIG. 2E is a fragmentary sectional view in side elevation of still another embodiment of the cartridge valve shown in FIG. 1 and utilizing a C-frame construction with portions of the attendant cartridge removed to better illustrate the modified interior construction of the coil-actuator and including an inset drawing to better show the structure and positioning of the O-ring seals utilized in the modified structure and intended to further facilitate assembly;

FIG. 2F is a schematic, exploded perspective representation of selected portions of the valve of FIG. 2E and illustrating the C-frame with attendant parts positioned for insertion into the frame, the arrows 1 and 2 indicating the steps of construction of those parts;

FIG. 3A-3C are exploded views of portions of the cartridge valve shown in FIG. 1 and illustrating progressively how the valve and cartridge are cooperatively assembled to include the coil-actuator, and;

FIG. 4A-4D are schematic perspective drawings of coil-actuators constructed in accordance with the present invention and including means for sealing solenoid lead wires projecting from the actuator, wherein FIG. 4A shows a dual cap arrangement; FIG. 4B a single cap arrangement; FIG. 4C a crimped joint arrangement and FIG. 4D a moulded and crimped (cold formed) joint arrangement.

DETAILED DESCRIPTION OF THE PREFERRED EMBODIMENTS

Figure 1:
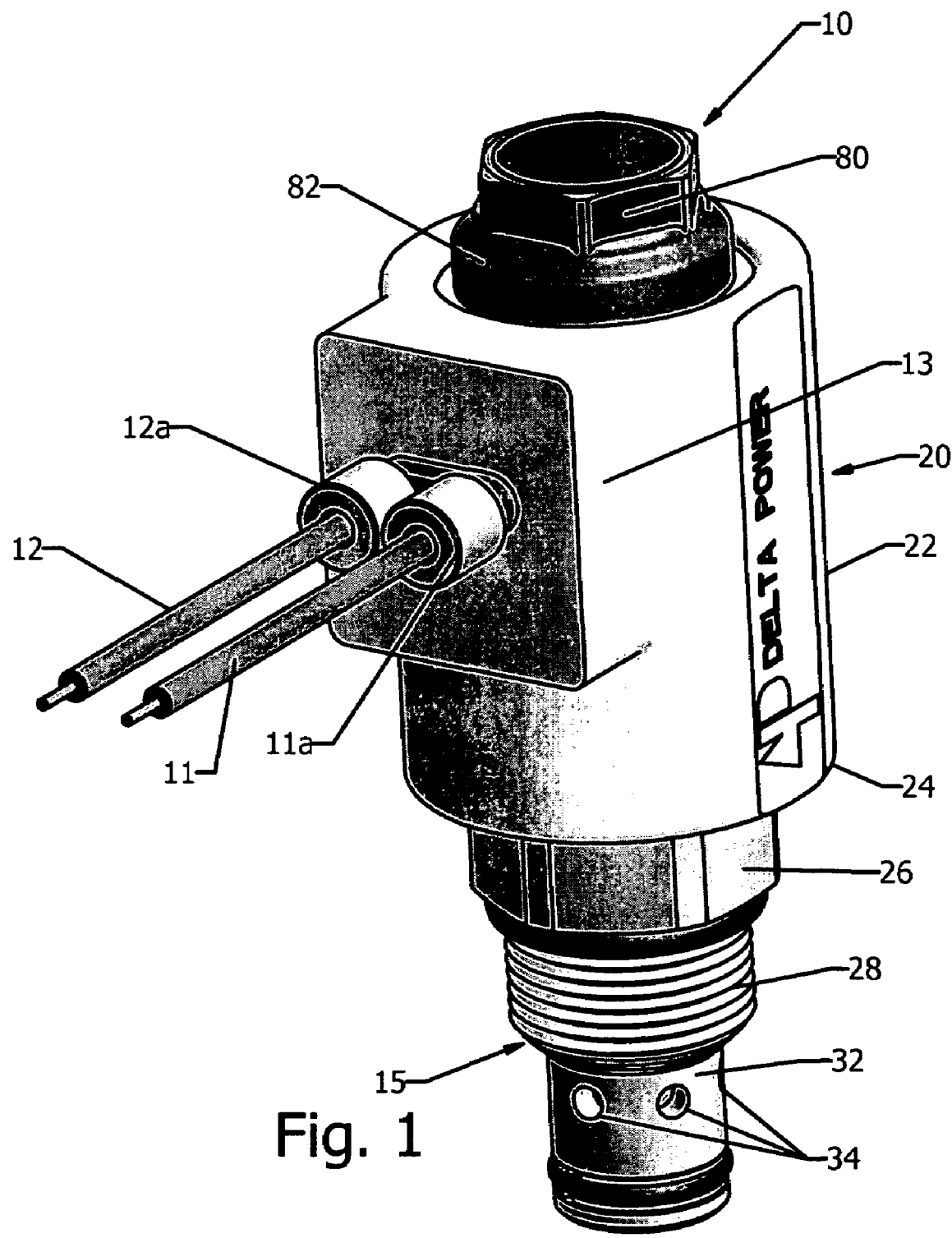
FIG. 1 is a perspective view of a solenoid operated cartridge valve employing a coil-actuator constructed in accordance with the present invention.

While the present invention is susceptible of being made in any of several different forms, the drawings show a particularly preferred form of the invention. One should understand, however, that this is just one of many structures that exemplify the construction of and manner in which the invention can be made. In the drawings, like reference numerals refer to like parts throughout the several views.

Turning now to the drawings, FIG. 1 illustrates a solenoid operated cartridge valve 10, comprising a coil-actuator assembly 20 and a cartridge 15, the cartridge being dimensioned for insertion within a bore 9 coaxial with the axis of a coil carrying bobbin 52 (FIGS. 2A-2F). The valve 10 is adapted, as discussed hereinafter, to be inserted and secured into a valve bonnet or hydraulic manifold (not shown). The valve is operated by applying a source of electrical power to external leads 11, 12 which extend into the novel coil-actuator 20 of the present invention and are coupled to the coil of the bobbin 52. As shall be explained more fully with respect to FIGS. 4A-4D, the leads are sealingly coupled to a junction (not shown) interiorly of and integral with a wire lead junction or lead coupling box 13, which in turn is formed preferably as part of the coil-actuator cover 22. To facilitate mounting of the cartridge valve in variant locations, the bobbin wire lead junction box 13 may be disposed in different locations beneath the cover 22. (Compare, for example, the location of the junction box 13 in the drawings of FIG. 4A-4D to its position in FIG. 1). As will be discussed below, with reference to the description of FIG. 2A-2E, the cover 22 is a moulded thermoplastic, which while being relatively environmentally stable under harsh operating and external environmental conditions, also acts as an insulator and an external, easily bonded shell for constraining flux in the flux carrying path elements of the frame interiorly of the coil-actuator 20. Typical encapsulates which may be employed to act as a cover 22 include Glass Fiber Reinforced Polybutylene Terephthalate (PBT), Polyethylene Terephthalate (PET) & Polyamides (Glass filled Nylon) if providing sufficient density and sections of material to accommodate water absorption rates.

As shown in FIGS. 1 & 2A-2E, the coil-actuated cover 22, at one end 24 thereof, is connected, to a capture element, in the illustrated instance a nut shaped retainer 26, which as will be shown forms part of the cartridge 15 and which is externally threaded as at 28 for coupling to a manifold or valve bonnet (not shown). The cartridge 15 is adapted to receive therein a cage or sleeve 32. This structure allows reciprocation within the cage 32 of a spool 6 connected to a solenoid armature 7 under control of the coil for covering and uncovering the flow ports 34 of the cage 32. An armature/spool return spring 7a normally biases the armature 7 and thus the connected spool 6 to, in the present instance, the normally closed position. It should be noted that many other spool/cage combinations are available, for example: 2 position, normally open; 2 position directional controls with 2, 3, 4 or more ports being disconnected or connected in combination.

Turning now to FIGS. 2A-2E, the internal structure of the coil-actuator 20 portion of the valve 10 is illustrated therein along with selected parts of the cartridge 15 to facilitate understanding of the structure. To this end, and as shown in the drawings, the cartridge 15 comprises the nut shaped retainer 26 which includes an interior recess or bore 27 for receiving a cylindrical sleeve 29 (composed of, for example, stainless steel) which is attached, at one terminal end 29a thereof, as by brazing to the internal surface of the bore 27 of the nut 26. As shown, at the opposite end 29b of the sleeve 29 is inserted a stepped plug 36. As illustrated, the plug 36 has an inserted first end 38 which is reduced in diameter to fit the interior of the sleeve 29. In a manner like the nut 26, the sleeve 29 is also secured, in the present instance brazed at its second end 29b to the first end 38 of the plug 36. (At this juncture, it should be noted that alternate methods of manufacture, including threaded joints, welded joints, glue joints, cold forming joints, pressing joints, etc. may be reasonably employed.) The plug 36 also includes an increased diameter portion 40, dimensioned with substantially the same outside or external diameter as the O.D. of the sleeve 29 and the I.D. of bore 9, and terminating in a reduced diameter, threaded end portion 42. As discussed below, the purpose of the threaded end portion 42 is to sealingly and environmentally tie the whole assembly together by use of another capture element, in the illustrated instance a cap nut 80 to form the solenoid operated cartridge valve 10, as shown in FIG. 1.

Circumscribing the structure thus far described is a coil mounting assembly or structure 50. The structure includes an insulated core, e.g. a plastic, formed as a cylindrical spool or bobbin 52, having end rim like portions 53, 55 which serve as end caps for the wire coil 56 wound upon the bobbin 52. The inner diameter of the bobbin 52 is dimensioned to circumscribe the sleeve 29 and a cap or insulated cover shell 58 serves to seal the coil 56 to inhibit contaminant entry. As shall be seen from the discussion which follows, the cap or shell 58 may be formed when the cover 22 is moulded in place, thus sealing the bobbin 52 with the same material as the cover. However, it should be recognized that a separate encapsulate insulator material may be employed for the cap or shell 58.

Turning now to FIGS. 2A-2D, intermediate the moulded coil-actuator cover 22 and the cap or shell 58 of the bobbin 52 is captured a flux carrying element, in the illustrated instance a rolled steel sleeve 60, which in conjunction with other flux carrying elements comprises the internal frame of the coil-actuator assembly. The sleeve 60 is preferably selectively apertured to allow material flow through the apertures, locking or capturing the sleeve 60 to the cap 58 and cover 22 as they may be assembled in or by a thermoplastic moulding process.

Abutting the exterior end surfaces of the respective rims 53, 55 of the bobbin 52 are flux path connectors, in the present instance a pair of washer like discs, 63, 67, which engage the sleeve 60 and define and concentrate the flux path toward the armature 7. Each disc has a central aperture 64, 68 and preferably mates with an axially extending metal tubular central portion 65, 69 extending into engagement with the rim portions of the apertures 64, 68 of the discs 63, 67, respectively. At this juncture in the discussion, it should be noted that the discs 63, 67 are substantially identical and thus the inset drawing in effect applies to both ends of the structure. However it should be understood that one or both of the discs 63, 67, may be integral with or otherwise in metal to metal contact with the sleeve 60, and may take other forms consistent with their intended purpose of acting as flux path connectors.

Figure 2A:
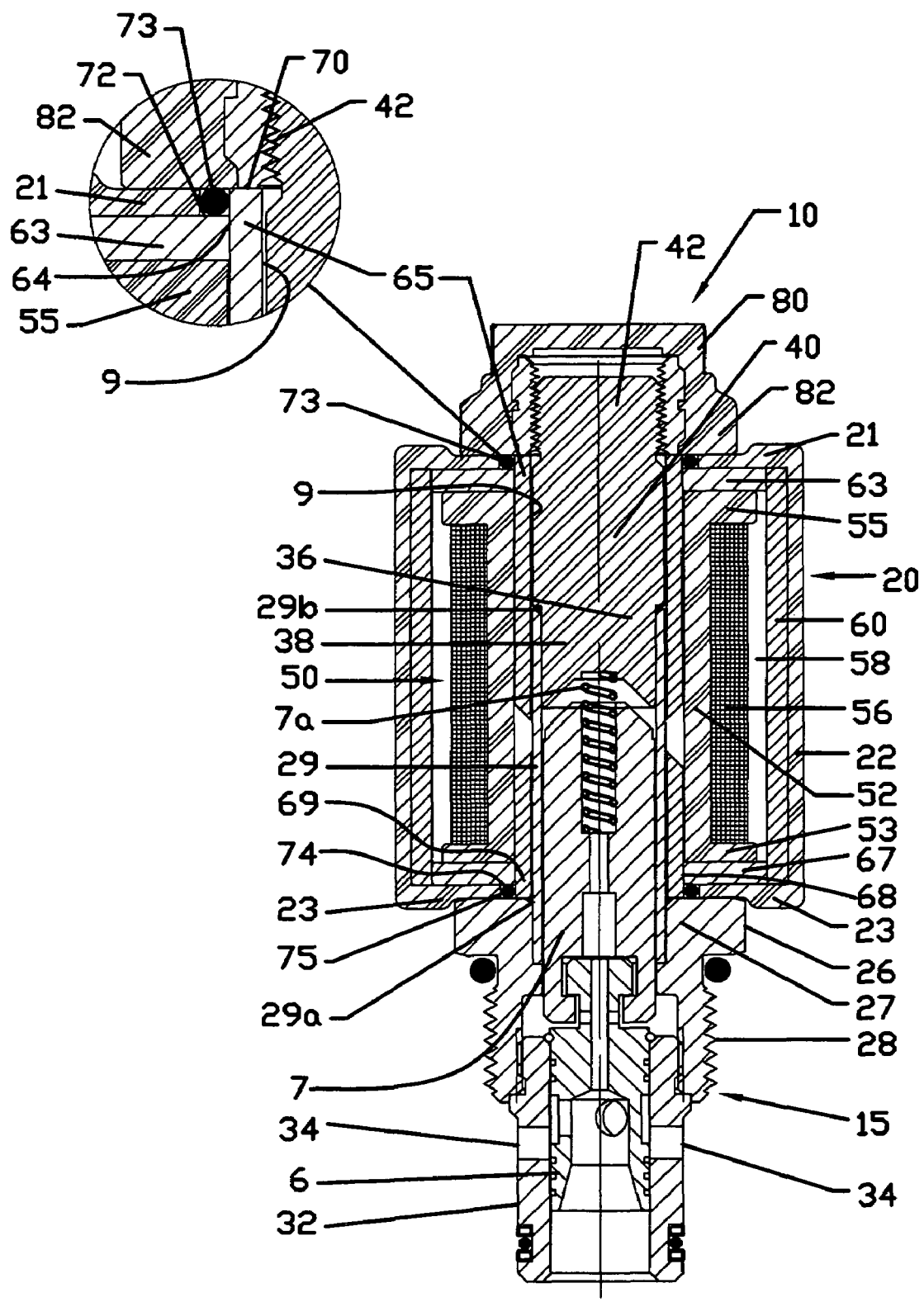
FIG. 2A is a fragmentary sectional view in side elevation of the coil-actuator portion of the cartridge valve shown in FIG. 1 with portions of the attendant cartridge removed to better illustrate the interior construction of the coil-actuator and including an inset drawing to better illustrate the structure and positioning of the O-ring seals.

As shown in FIG. 2A, and particularly in the inset, each of the axially extending central portions 65, 69 terminates in a radially extending flat portion 70. As also shown in the drawing and particularly the inset, the moulded cover 22 includes annular end portions 21, 23 which extend in circumferentially, overlapping, confronting and intimate contact with the flux path connectors or discs 63, 67 capturing the discs. Moreover, as shown in the inset, the annular terminal ends 21, 23 of the cover does not extend to the axially extending projecting portions 65, 67 but terminates short of and are radially spaced from the central portions so as to form an annular recessed groove like receptacle 72 therebetween. Although not shown in the drawings, the flux path connectors or discs 63, 67 may be of increased thickness closer to their central apertures 65, 69 to enhance flux density closer to the plug 36 and armature 7.

In accordance with a feature of the invention, O-rings 73, 75 are dimensioned to be inserted within the groove like receptacle 72, 74 at each end of the structure, the O-rings having a thickness sufficient to extend above the plane of the flat portion 70 of the projecting central portions 65, 69 of the discs 63, 67. At this point, it should also be recognized that the projecting central portions 65, 69 are there for the convenience of forming one wall of the receptacle 72, and as is discussed more fully hereinafter, while the projecting central portions are desirable and increase flux path efficiency, their purpose is as set forth above and to insure positive, metal to metal engagement with a cartridge capture element preferably formed as a cap nut 80 (See FIGS. 2A, 2C and 2E). It should also be noted that the shape of the projecting central portions 65, 69 lengthens the radial flux path to plug 36 and armature 7 via its' elongated proximity within the valve bore 9.

The capture element or cap nut 80 is internally threaded and includes a disc like rim portion 82. The capture nut serves multiple purposes. It serves to seal the coil-actuator 20 from harsh environmental conditions; to simultaneously secure the cartridge 15 to the coil-actuator to form the cartridge valve 10, and; to provide a path for flux to enhance the flux density. As the cap nut 80 is tightened onto the threaded end 42 of the plug 36, the rim portion 82 first engages and distorts the O-rings 73, 75 into the groove like receptacles 72, 74, thereby sealing the receptacles 72, 74 at each end of the structure. As the nut 80 is tightened, the plug 36 and the sleeve 29, which is also attached to the nut 26 is axially tensioned forcing the nut 26 against the O-ring 75 and the flat portion 70 of the projecting central portions 65, 69 of the discs 63, 67. Accordingly, tightening the nut 80 simultaneously forces a sealing and metal to metal contact against the discs 63, 67 and their flux carrying projecting central portions 65, 69. Inasmuch as the discs 63, 67 bear against the interior of the sleeve 60 and provide for an additional passage to the surfaces along and between the surfaces between armature 7 & plug 36 via the projecting central portions 65, 69, an increase in flux density and more efficient coil operation results.

Figure 2B:
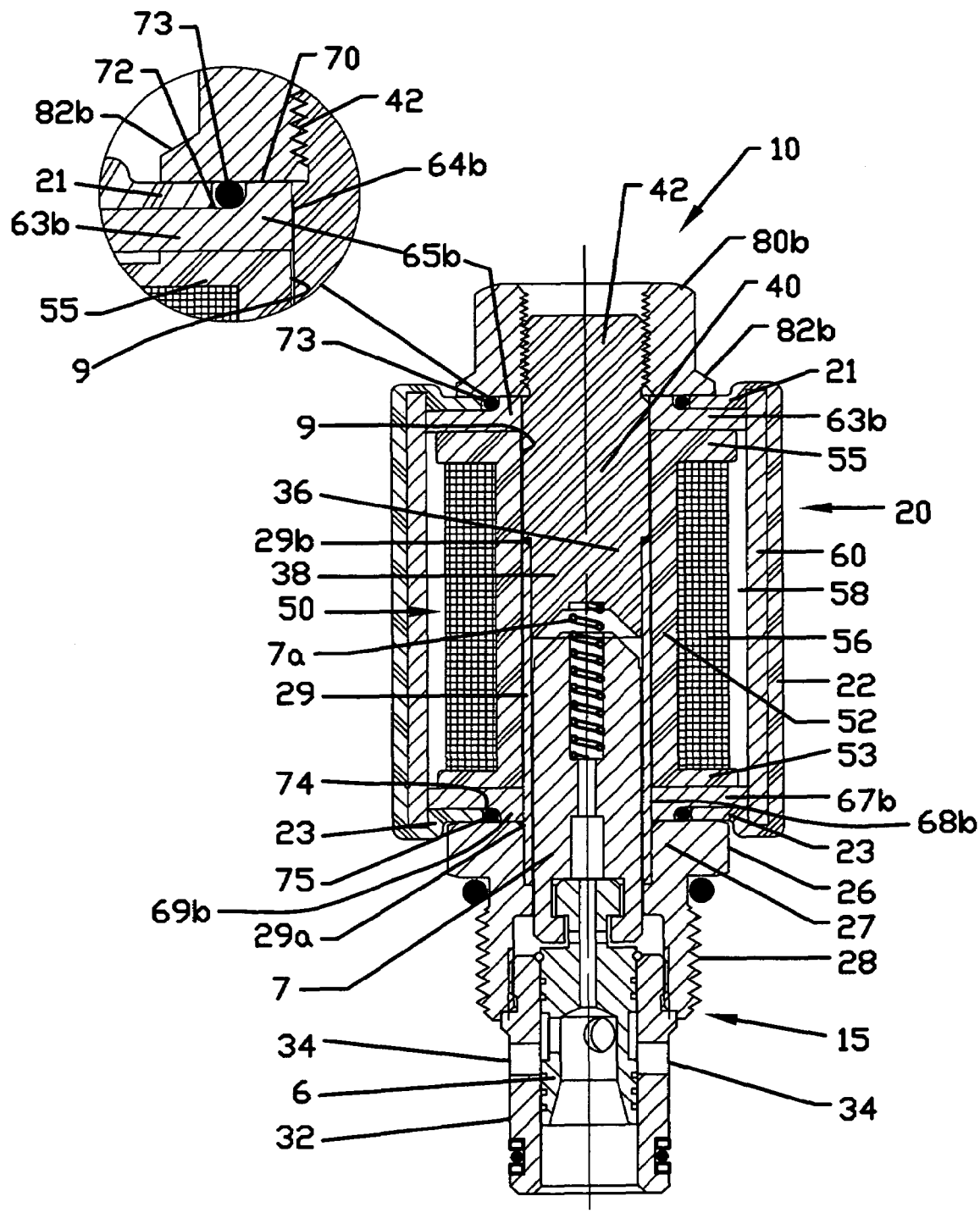
FIG. 2B is a fragmentary sectional view in side elevation of another embodiment of the cartridge valve shown in FIG. 1 with portions of the attendant cartridge removed to better illustrate the modified interior construction of the coil-actuator and including an inset drawing to better depict the structure and positioning of the O-ring seals.
Figure 2C:
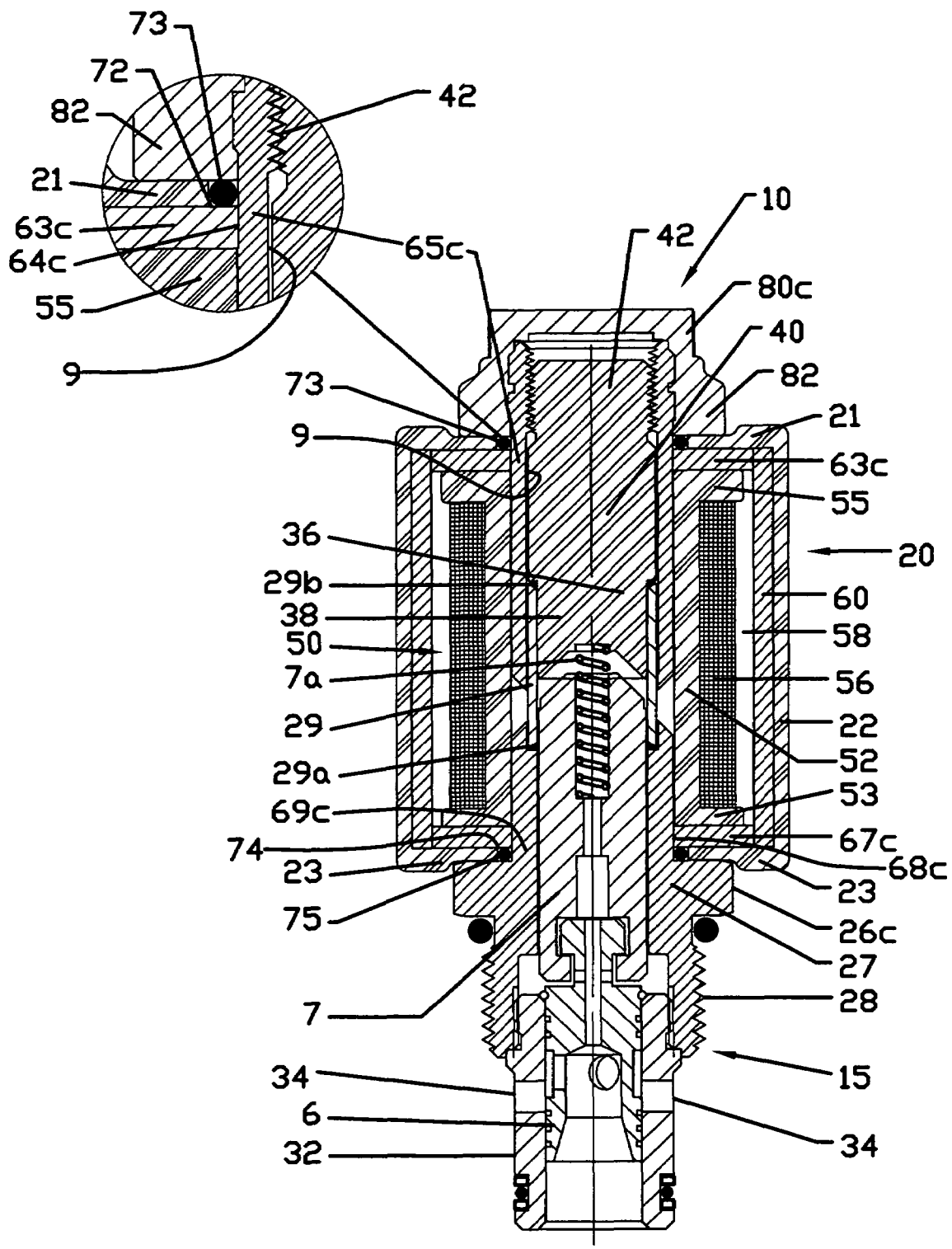
FIG. 2C is a fragmentary sectional view in side elevation of still another embodiment of the cartridge valve shown in FIG. 1 with portions of the attendant cartridge removed to better illustrate the modified interior construction of the coil-actuator and including an inset drawing to better show the structure and positioning of the O-ring seals.

FIG. 2B illustrates a variation of the embodiment of the structure illustrated in FIG. 2A wherein modified discs 63b, 67b each have a central aperture 64b, 68b and preferably includes an axially extending metal tubular central portion or rim 65b, 69b extending from the apertures 64b, 68b of the discs 63b, 67b, respectively for the purpose of increasing flux carrying capability to the armature 7 and plug 36 and magnetic connection via the flux path connectors to the capture nuts or retainers 26, 80. In the illustrated instance, the rims 65b, 69b form the interior surface of the receptacles 72, 74 for receiving the O-rings 73, 75. It also should be recognized that the nut may take any of a number of configurations. For example, the nut 80b (FIG. 2B) is not formed as a cap nut but is more conventional in form and is open at its end rather than capped.

In this connection, especially with an open ended nut like the nut 80b in FIG. 2B, to decrease the possibility of internal contamination of the coil-actuator, it may be desirable to further seal the threads associated with the nut 80b and the threaded end portion 42 of the plug 36. To this end a thread sealing adhesive may be employed. For example, an excellent choice of such an adhesive/sealant is a "Loctite® brand 517 Vibra Seal, Pre-applied Thread Sealant". Of course other sealants may be employed but the sealant should preferably be of a type to not only seal out the environment, but to inhibit unintentional loosening of the nut 80b under severe operating conditions. Of course, other conventional means may be employed to inhibit unintentional loosening, for example a frictional plastic insert which serves as a lock washer and a seal may be employed. It should also be recognized that in any of the embodiments shown in FIGS. 2A-2E, if severe shock and environmental conditions are being designed for, adhesive/sealant have the same desired qualities as heretofore mentioned, may also be employed.

It also should be recognized that the nut 80 may be configured or dimensioned with a larger diameter so that a rim portion is unnecessary. For example, an acorn nut be employed. In such a configuration, an enlarged nut 80c having a flat, radially extending exposed surface would bear against the O-ring 73. As illustrated best in FIG. 2C, the nut 80c may also be configured, with a simple reversal of parts, to include an axially projecting or extending interior sleeve like member 65c for engaging the inner periphery 64c of the disc 63c while retainer nut 26c may include a like axially projecting or extending interior sleeve like member 69c which is configured to engage the inner periphery 68c of the disc 67c. In this kind of embodiment, the O-rings 73 & 75 would be fitted around the projecting members 65c, 69c respectively and would be squeezed into engagement with the surface of the respective discs 63c, 67c. Thus the axially extending projections would project from the nut as opposed to the projections extending from the interior of the bore and would engage the periphery of the aperture of the disc. As is readily recognizable from the forgoing, the receptacle for receiving the O-rings may be formed in either the cap nut or in the body of the coil-actuator, and the cap nut may include the projections 65c, 69c in a mere reversal of parts still retaining seal integrity and flux carrying capability.

Figure 2D:
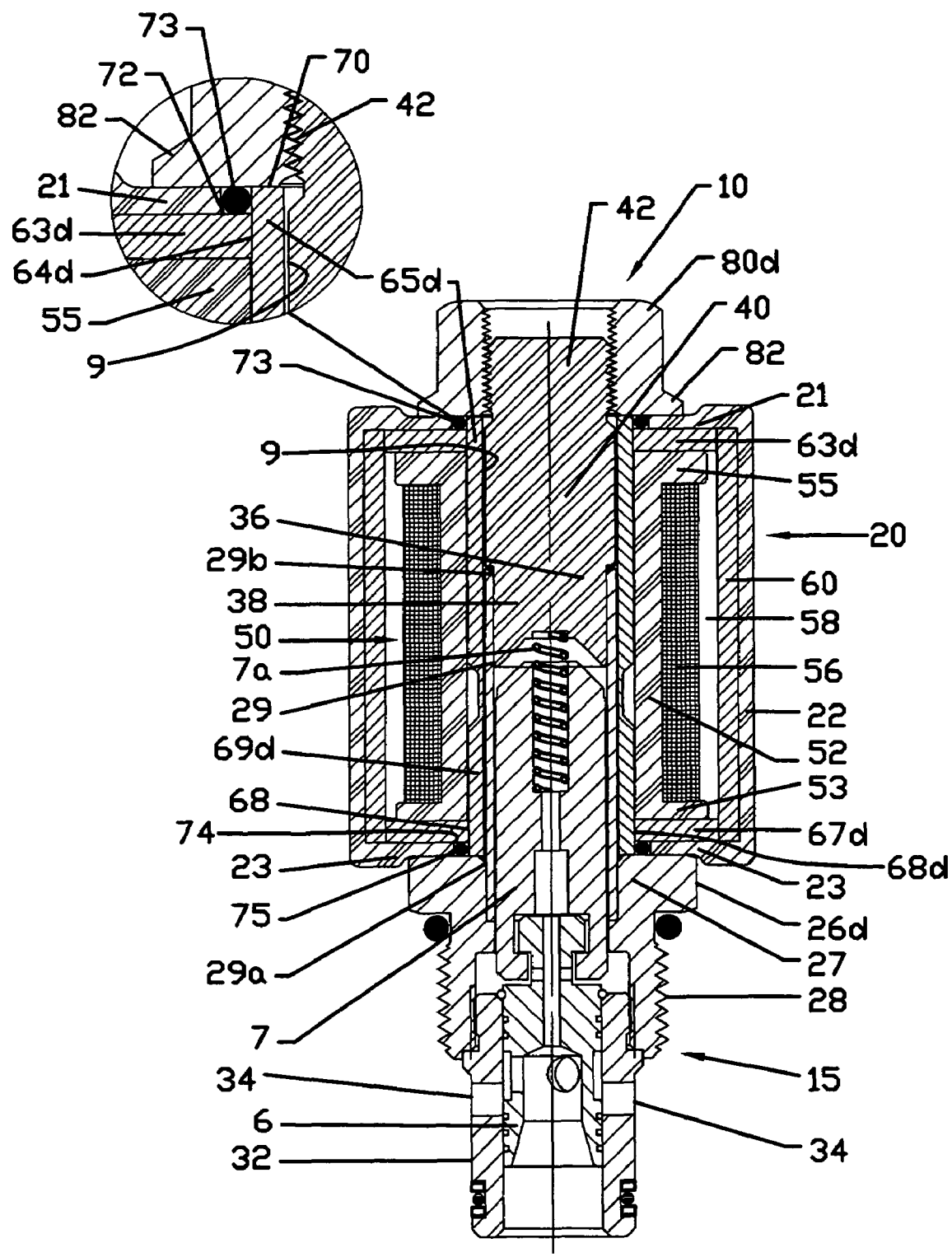
FIG. 2D is a fragmentary sectional view in side elevation of yet another embodiment of the cartridge valve shown in FIG. 1 with portions of the attendant cartridge removed to better illustrate the modified interior construction of the coil-actuator and including an inset drawing to better show the structure and positioning of the O-ring seals the modified structure intending to facilitate assembly.

In still another embodiment, shown in FIG. 2D, the pair of tubular metal projections 65, 69 of FIG. 2A has been replaced with a single metal tubular sleeve 65d dimensioned to engage, at opposite ends thereof, the nuts 80d and 26d respectively while simultaneously contacting the discs 63d and 67d respectively. The purpose of this embodiment is to facilitate manufacture and assembly of the parts of the coil actuator assembly 20 and to eliminate the need for a sealed nut for environmental sealing as the O-ring seals 73, 75 in this embodiment also seal entry from the interior. As shown, the tube 65d preferably includes a reduced central portion 69d to reduce (while not entirely eliminating) the magnetic shunt tendency of the continuous tubular construction. It should be noted that losses are somewhat negated by the lengthened radial flux passage provided by tube 65d to the armature 7 and plug 36 within the bore 9 of the coil actuator. It should be noted that losses are somewhat counteracted by the additional flux passage to the surfaces along and between armature 7 and plug 36 via the projecting central portions 65d, 69d resulting in an increase in flux density and more efficient coil operation.

As discussed heretofore, it is understood that one or both of the discs 63, 67, may be integral with or otherwise in metal to metal contact with the sleeve 60, and may take other forms consistent with their intended purpose of acting as flux path connectors. In this connection, and turning briefly to FIG. 2E, it should be obvious to those skilled in the art of coil fabrication and assembly, that a similar technique could be applied with what is commonly referred to as a "C-Frame" (e.g. a double ended folded plate). In this structure, the frame includes a planar or plate portion 60e having a pair of projecting, substantially parallel and spaced apart legs 63e, 67e. Within each leg 63e, 67e are apertures 64e, 68e. Thus the plate portion 60e is functionally comparable to the sleeve 60 and the legs 63a, 67a are functionally comparable to the discs 63, 67. Moreover, similar axially extending metal tubular central portions 65e, 69e may be fitted within the apertures 64e, 68e. As shown in FIG. 2F, in this embodiment, the bobbin 52 with its associated coil 56 is inserted between the legs 63e, 67e and the axially extending metal tubular central portions 65e, 69e are inserted into the bobbin 52 and define, interiorly thereof, the bore 9. Thus in comparing this embodiment to the embodiments of FIGS. 2A-2D, legs or the discs and plate or the sleeve of the frame act as a flux path connector between the nuts 26 and 80 and further provide for increased length flux carriers to the armature 7 and plug 36 for the purpose of intensifying the flux to those surfaces along and between armature 7 and the increased diameter portion 40 of the plug 36 as well as the remaining portion interiorly of the bore 9. In addition, the C-frame like construction offers simplicity and economies of construction and assembly that are readily apparent to one skilled in the art, even though the resulting construction is not as efficient as a flux carrier because of the open sides inherent in the C-frame construction.

While each of the embodiments of FIGS. 2A-2E has their specific advantages, as presently advised, the embodiment of FIG. 2A or 2B is preferred. However, it should be understood, that the embodiment of FIGS. 2D and FIG. 2C may be employed where different efficiency, and that of FIG. 2E and 2F may be preferred if economy of construction or assembly is desired. Thus the construction of the coil-actuator of the present invention is flexible and alterations or modifications may be tolerated to meet different needs or requirements.

Turning now to FIG. 3A-3C the assembling of the coil-actuator assembly 20 to a cartridge 15 to form a cartridge valve 10 is serially shown therein. Inasmuch as the assembly is similar for each of the embodiments, i.e. FIGS. 2A-2E, the embodiment of FIG. 2A is illustratively employed. To this end, the cartridge 15 is first installed into the coil-actuator 20 with the O-ring seal 75 installed in the lower groove or receptacle 74, and the upper O-ring seal 73 installed in its' associated receptacle 72. The capture element or nut 80 is then screwed onto the threaded end 42 of the plug 36 forcing nuts 80 and 26 into compression against the flat portion 70 of the associated discs 63, 67 and compressing their associated O-ring seals 73, 75. In this manner a cartridge valve 10 is formed which is rugged, resistant to environmental extremes, and allows for increased efficiency in operation.

Figure 4A:
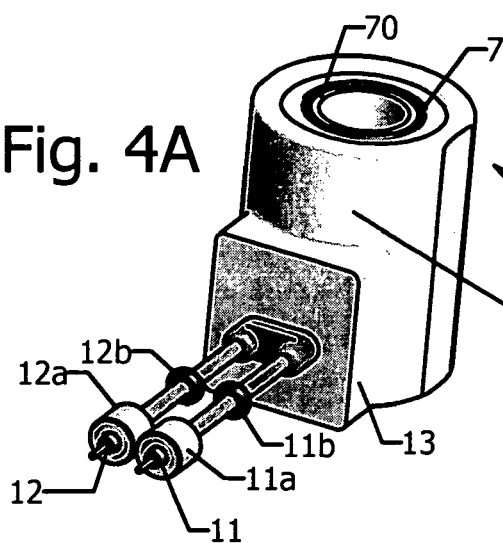
Figure 4C:
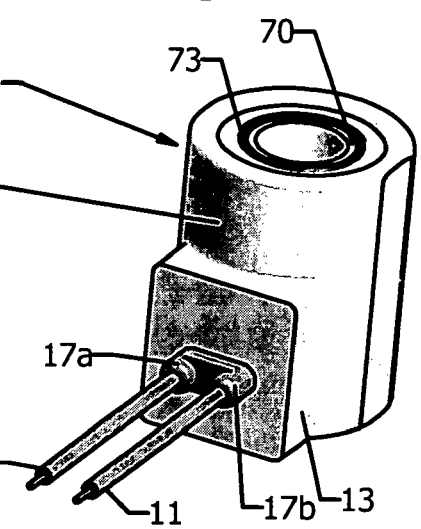
Figure 4B:
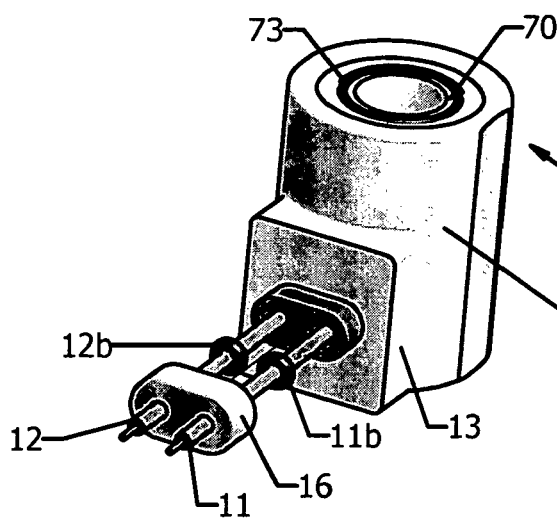
Figure 4D:
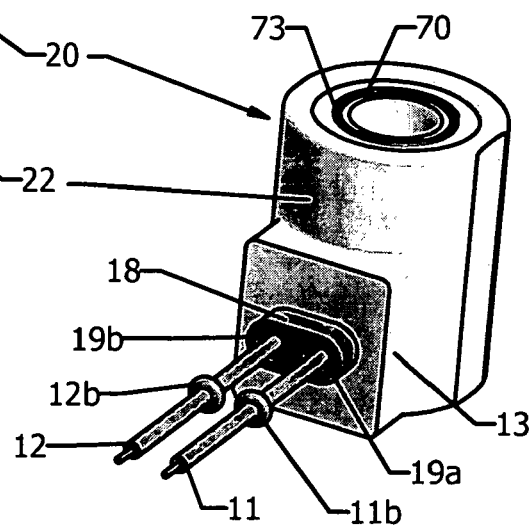

In FIG. 4A-4D the coil-actuator 20 is shown with four different connectors for inhibiting environment into the only other entry point into the cover 22, as where the coil wire ends are exposed for attachment to a source of power. Although not shown in the drawings, conventionally the terminal wire ends of the coil 56 may be terminated in any convenient fashion. For example, spade lugs attached to the bobbin 52 rim like portions 53, 55 and then connecting leads connected to the wires (e.g. 11 and 12) or pins internally of the junction box and which pass through one wall of the junction box 13 for attachment to an external power source. For example, in FIG. 4A, small O-ring seals 11b, 12b on the wires 11, 12 are pushed into contact with the entry point into the bobbin wire lead junction box 13 and seal the entry point of the wires or pins into the junction box 13. These in turn are held in place by a pair (dual) insulating and sealing caps, 11a, 12a. In a like manner, in FIG. 4B, a single cap 16 is employed circumscribing both wires 11, 12 to hold the O-rings 11b, 12b against the junction box and in sealing engagement therewith. Similarly, in FIG. 4C, crimped (cold formed or pressed) joints may be employed to affect an environmental seal with the integral injunction box 13 through compression of plastic material in regions of 17a, 17b into intimate sealing contact with the insulation of wires 12, 11 respectively. In FIG. 4D, a moulded and crimped arrangement is illustrated where O-rings 11b, 12b are held in position within moulded grooves or recesses 19a, 19b respectively in boss 18 and subsequently the material of the boss 18 is compressed or crimped for the purpose of holding the O-rings in intimate sealing contact with the insulation of wires 12, 11 and within the grooves or recesses 19a, 19b themselves. It of course should be recognized that other methods and sealing regimes may be employed to inhibit harmful environment entry into this area of the coil-actuator of the present invention. For example, integrally moulded connectors of other types may allow other existing seals to be utilized.

The coil-actuator of the present invention, while using O-rings in a conventional manner for sealing purposes, allows the placement of them to be such that metal to metal contact is facilitated and radial passage lengthened to increase the efficiency of the coil by enhancing the flux path. Moreover, the present invention provides a convenient and inexpensive way for increasing harsh or unwanted environment entry into the coil-actuator through the leads.

While the embodiments illustrated in the various drawings described above are presently preferred, it should be understood that those embodiments are offered by way of example only. The invention is not intended to be limited to any particular embodiment but is intended to extend to various modifications.

What is claimed is:

1. A coil-actuator for a cartridge type solenoid valve, said coil-actuator having a central bore and comprising:
    a metal frame to provide a path for magnetic flux;
    a coil carrying bobbin interiorly of said frame, within the confines thereof and insulated therefrom;
    a plastic encapsulation over the metal frame to form a cover for said frame and said bobbin;
    a pair of metal, axially spaced apart, flux path connectors at either end of said metal frame and bobbin, in intimate contact therewith, and at least partially retained by said cover; said connectors having central apertures substantially the same diameter as said bore, each connector having a first portion extending substantially outwardly from a longitudinal axis of the bore, and a second portion extending substantially parallel to the longitudinal axis of the bore, the second portion being in contact with the first portion;
    a receptacle formed intermediate a terminal edge of said cover and a portion of connectors and dimensioned to receive an O-ring in each of said receptacles; and
    a first capture element for engaging a cartridge insertable in said bore and having a portion for connection with one of said connectors and sealing by one of said O-rings; and
    a second capture element for connection with the other of said connectors and in sealing engagement therewith to seal the opposite end of said coil-actuator structure when said cartridge is installed in said bore, thereby simultaneously insuring a metal to metal contact with said connectors, whereby the flux density and path for flux, when the valve is in operation, is defined;
    wherein the second portion of each connector extends toward the first and second capture elements respectively, each O-ring being in sealing contact with a first and second portion of a respective connector and a respective capture element, the second portion of each connector being located between each respective O-ring and the bore in a radial direction.

2. A coil-actuator for a cartridge type solenoid valve in accordance with claim 1 wherein at least one of said central apertures corresponds to the diameter of said bore.

3. A coil-actuator for a cartridge type solenoid valve in accordance with claim 1 wherein said frame comprises a sleeve.

4. A coil-actuator for a cartridge type solenoid valve in accordance with claim 3 wherein the first portion of at least one of the connectors comprise a disc like washer.

5. A coil-actuator for a cartridge type solenoid valve in accordance with claim 1 wherein the second portion is a metal annular projection for interconnecting at least one of said connectors and its associated capture element.

6. A coil-actuator for a cartridge type solenoid valve in accordance with claim 5 wherein said metal annular projection interconnects both of said connectors and their associated capture elements.

7. A coil-actuator for a cartridge type solenoid valve in accordance with claim 6 including a reduced thickness portion to reduce the flux shunting effect of said projection.

8. A coil-actuator for a cartridge type solenoid valve in accordance with claim 6 wherein each of said projections includes a portion forming a first wall of said receptacle.

9. A coil-actuator for a cartridge type solenoid valve in accordance with claim 8, wherein said metal annular projection comprises an axially extending sleeve mounted interiorly of said bore and including portions forming said first wall of said receptacle.

10. A coil-actuator for a cartridge type solenoid valve in accordance with claim 8, wherein said sleeve of said metal annular projection includes a necked down portion.

11. A coil-actuator for a cartridge type solenoid valve in accordance with claim 1 including a pair of axially spaced apart annular projections in said bore for interconnecting each of said connectors and its associated capture element.

12. A coil-actuator for a cartridge type solenoid valve in accordance with claim 1 wherein said frame is C-shaped in cross section, and said first portions of the connectors form substantially parallel legs of said C.

13. A coil-actuator for a cartridge type solenoid valve in accordance with claim 12, including a metal annular projection for interconnecting at least one of the connectors to said capture element.

14. A coil-actuator for a cartridge type solenoid valve in accordance with claim 1 including:
 a wire lead junction box within said insulator over mould cover for connection to said coil in said bobbin;
 at least a pair of wire leads extending externally of said cover from said junction box and insulating cover, and;
 at least one insulating sealing cap over said wires to enhance the seal of the interior of said cover and junction box from the environment.

15. A coil-actuator for a cartridge type solenoid valve in accordance with claim 14 including:
 O-rings over said wire leads and against said cover to effect said sealing.

16. A coil-actuator for a cartridge type solenoid valve in accordance with claim 1 including:
 a wire lead junction box within said insulator over mould cover for connection to said coil in said bobbin;
 at least a pair of wire leads extending externally of said cover from said junction box and insulating cover, and
 crimped joints of plastic material at the interface between the cover and said leads at said junction box to affect an environmental seal between the wire leads and said cover.

17. A coil-actuator for a cartridge type solenoid valve including, said coil-actuator having a central bore and comprising:
 a metal frame to provide a path for magnetic flux;
 a coil carrying bobbin interiorly of said frame, within the confines thereof and insulated therefrom;
 a plastic encapsulation over the metal frame to form a cover for said frame and said bobbin;
 a pair of metal, axially spaced apart, flux path connectors at either end of said metal frame and bobbin, in intimate contact therewith, and at least partially retained by said cover; said connectors having central apertures substantially the same diameter as said bore;
 a receptacle formed intermediate a terminal edge of said cover and a portion of connectors and dimensioned to receive an O-ring in each of said receptacles, said O-rings extending above the surface of said connectors;
 a capture element for engaging a cartridge insertable in said bore and having a portion for connection with one of said connectors and sealing by one of said O-rings; and another capture element for connection with the other of said connectors and in sealing engagement therewith to seal the opposite end of said coil-actuator structure when said cartridge is installed in said bore, thereby simultaneously insuring a metal to metal contact with said connectors, whereby the flux density and path for flux, when the valve is in operation, is defined;
 wherein said frame is C-shaped in cross section, and said connectors form substantially parallel legs of said C;
 a metal annular projection for interconnecting at least one of the connectors to said capture element; and
 a second annular projection, axially spaced apart from said first annular projection, and each including a portion forming said first wall of said receptacle.

18. A coil-actuator for a cartridge type solenoid valve, said coil-actuator comprising:
 a metal sleeve shaped to provide a path for magnetic flux;
 a coil carrying bobbin interiorly of said sleeve, and insulated therefrom;
 an insulator encapsulated over the metal sleeve to form a circumferentially extending cover for said sleeve and said bobbin;
 a pair of metal, axially spaced apart, centrally apertured discs at opposite ends of said metal sleeve and bobbin, in intimate contact therewith and forming therewith a bore for receipt of a cartridge;
 a first and second annular receptacle having a first wall formed of a metal annular projection at least in engagement with the inner periphery of the central aperture of a respective disc and forming the interior wall of said receptacle, and a second wall of said receptacle formed using at least a portion of each of said discs, said receptacles dimensioned to receive an O-ring therein, said O-rings extending above the surface of said discs;
 a capture element for engaging a cartridge subsequent to its insertion in the bore having a retainer for engagement with one of said discs and sealing by one of said O-rings; and a second capture element for engagement with the other of said discs and in sealing engagement with the second of said O-rings to seal the opposite end of said coil-actuator and to simultaneously insure a metal to metal contact with said discs and a cartridge when installed; whereby the flux density and path for flux, when the valve is in operation, is enhanced
 wherein a portion of each annular projection extends toward each capture element, each annular projection being located between a respective O-ring and the bore, each O-ring being located between and in contact with a respective disc and a respective capture element, each O-ring being in contact with the respective annular projection.

19. A coil-actuator for a cartridge type solenoid valve in accordance with claim 18, wherein each said metal annular projection comprises a sleeve mounted interiorly of said bobbin and including a portion forming said first wall of said receptacle.

20. A coil-actuator for a cartridge type solenoid valve in accordance with claim 19 wherein said sleeve is axially segmented and comprises first and second, spaced apart portions, each of which includes a portion forming said first wall of said receptacle.

21. A coil-actuator for a cartridge type solenoid valve in accordance with claim 20, wherein said metal annular projection comprises a ring in intimate contact with the inner periphery of said central aperture of at least one of said discs.

22. A coil-actuator for a cartridge type solenoid valve in accordance with claim 18, wherein said capture element includes a ring-like sleeve portion for mounting said O-ring thereon and insertable into the inner periphery of said central aperture of at least one of said discs and in intimate contact therewith.

23. A coil-actuator for a cartridge type solenoid valve in accordance with claim 22 including:
 O-rings over said wire leads and against said cover to effect said sealing.

24. A coil-actuator for a cartridge type solenoid valve in accordance with claim 18 including:
- a wire lead junction box within said insulator over mould cover for connection to said coil in said bobbin;
- at least a pair of wire leads extending externally of said cover from said junction box and insulating cover, and;
- insulating sealing caps to seal the interior of said cover and junction box from the environment.

25. A coil-actuator for a cartridge type solenoid valve in accordance with claim 18 including:
- a wire lead junction box within said insulator over mould cover for connection to said coil in said bobbin;
- at least a pair of wire leads extending externally of said cover from said junction box and insulating cover, and
- a crimped joint of plastic material at the interface between the cover and said leads at said junction box to affect an environmental seal between the wire leads and said cover.

26. A coil-actuator for a cartridge type solenoid valve, said coil-actuator comprising:
- a metal frame shaped to provide a path for magnetic flux;
- a coil carrying bobbin interiorly of said frame, within the confines thereof and insulated therefrom;
- a plastic, insulating cover encapsulated over the metal frame to form a cover for said frame and said bobbin, and an axially extending bore through said frame and said bobbin;
- said frame including at least a portion extending axially of said bore and a pair of spaced apart, substantially parallel leg portions at least in metal to metal contact with said first mentioned portion of said frame and said bobbin, and at least partially retained by said cover, each leg portion defining a central aperture forming having a diameter substantially the same as the diameter of the bore, an annular projection extending from each leg portion proximate the central aperture, the annular projections extending away from one another;
- a receptacle formed intermediate a terminal edge of said cover and a portion of said leg portions, and said annular projections and dimensioned to receive an O-ring in each of said receptacles, said O-rings extending above the exterior surfaces of said leg portions, the annular projections being located between the O-ring and the bore;
- a cartridge configured for insertion in said bore, said cartridge including a metal retainer thereon adjacent one end of said cartridge for metal to metal engagement with one leg of said frame and one of the annular projections, and in sealing engagement with one of said O-rings;
- and a capture element for displaceably engaging the other end of said cartridge and dimensioned for metal to metal engagement with at least the other leg of said frame and the other of the annular projections and said other O-ring, and displaceable to effect displacement of said cartridge in said bore to effect said sealing engagement by the retainer and associated O-ring to seal the opposite end of said coil-actuator structure, thereby simultaneously insuring a metal to metal contact with said frame; whereby the flux density and path for flux when the valve is in operation, is enhanced.

27. A coil-actuator for a cartridge type solenoid valve in accordance with claim 26 including at least one axially extending metal projection interiorly of said bobbin, at least in metal to metal contact with said legs of said frame and defining the bore for receipt of the cartridge.

28. A coil-actuator for a cartridge type solenoid valve in accordance with claim 27 wherein said metal projection comprises a sleeve including a necked down portion therein.

29. A coil-actuator for a cartridge type solenoid valve in accordance with claim 27 wherein said axially extending metal projection includes first and second, axially spaced apart portions.

* * * * *